May 31, 1932.  E. A. NELSON  1,861,238
TIRE RIM
Filed July 17, 1929   3 Sheets-Sheet 1
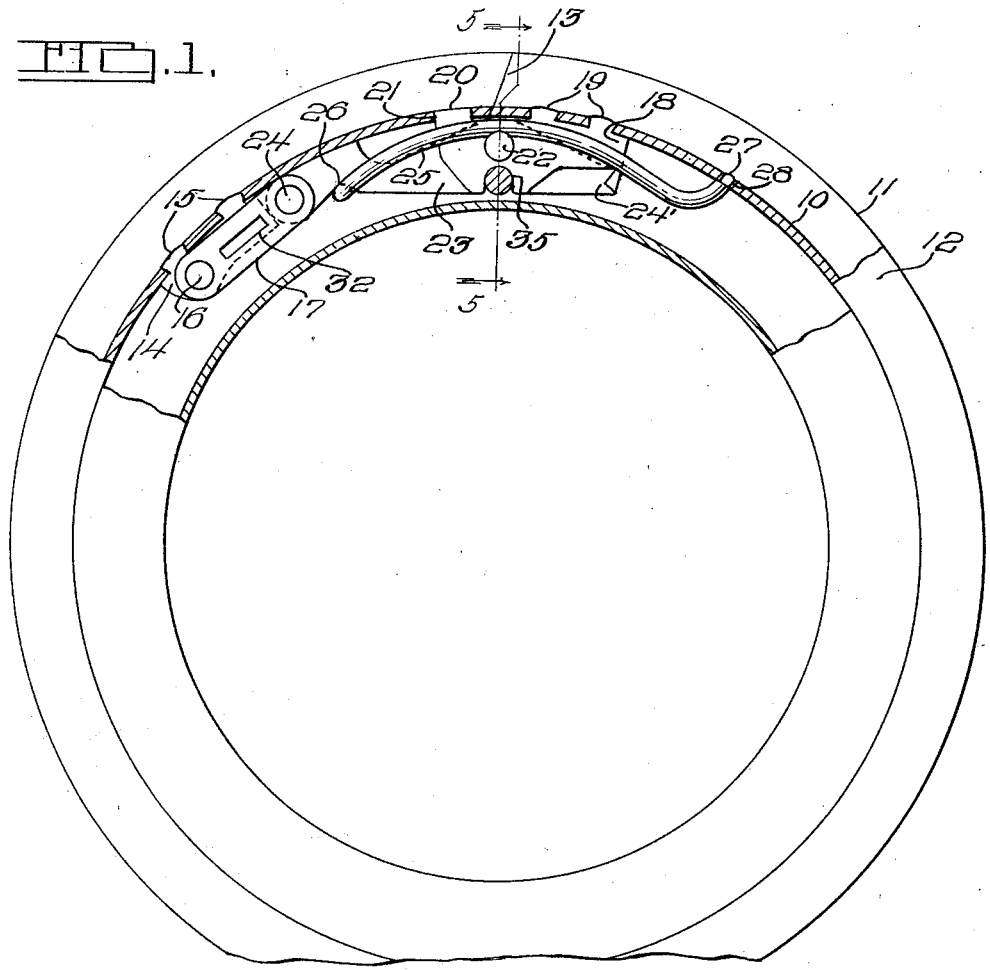
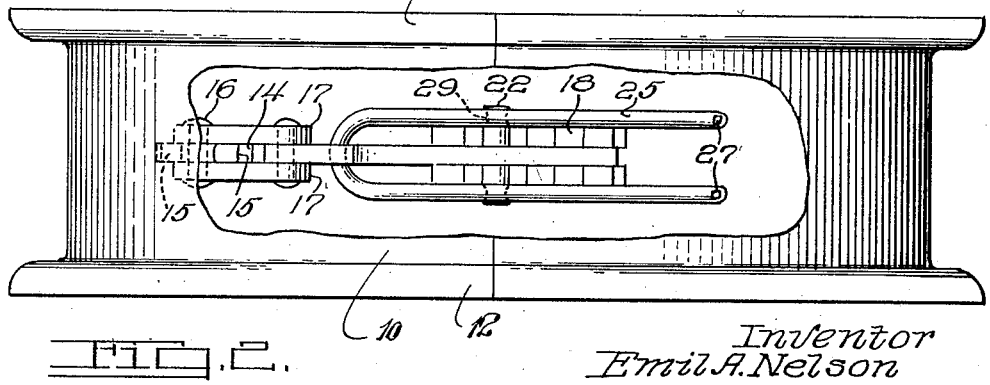
Inventor
Emil A. Nelson
by Harness, Dickey & Pierce
Attorneys.

May 31, 1932. E. A. NELSON 1,861,238
TIRE RIM
Filed July 17, 1929 3 Sheets-Sheet 2
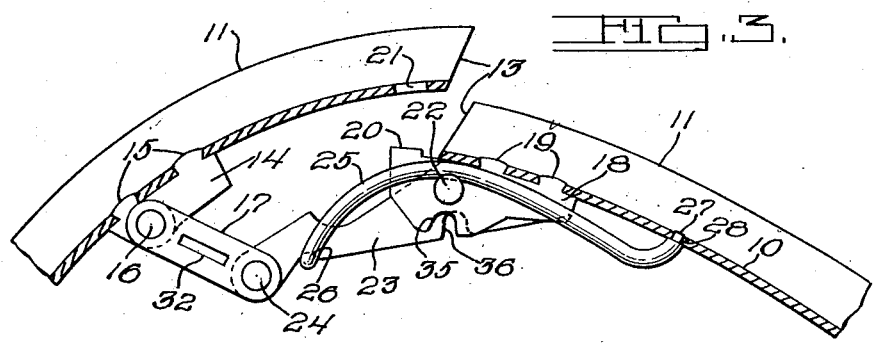
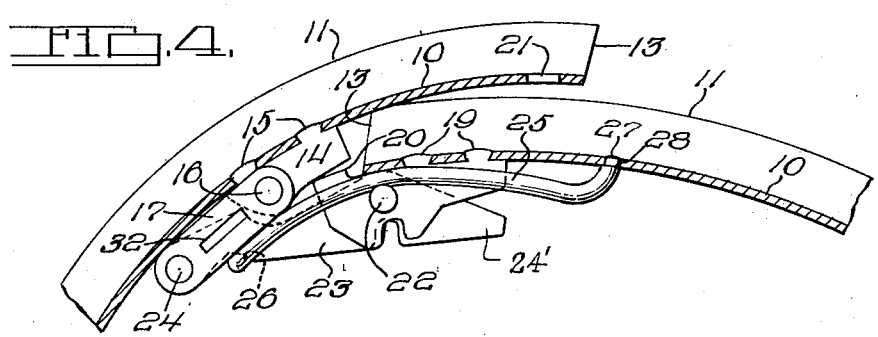
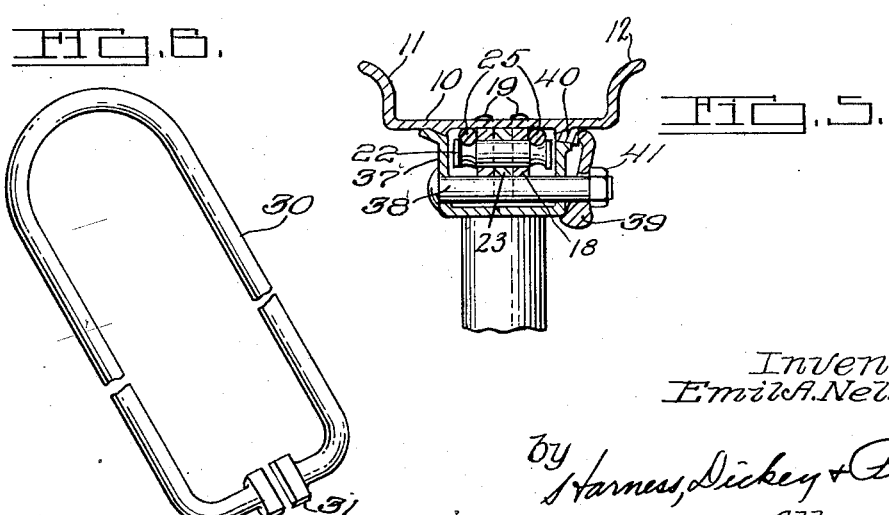
Inventor
Emil A. Nelson
by Harness, Dickey & Pierce
Attorneys.

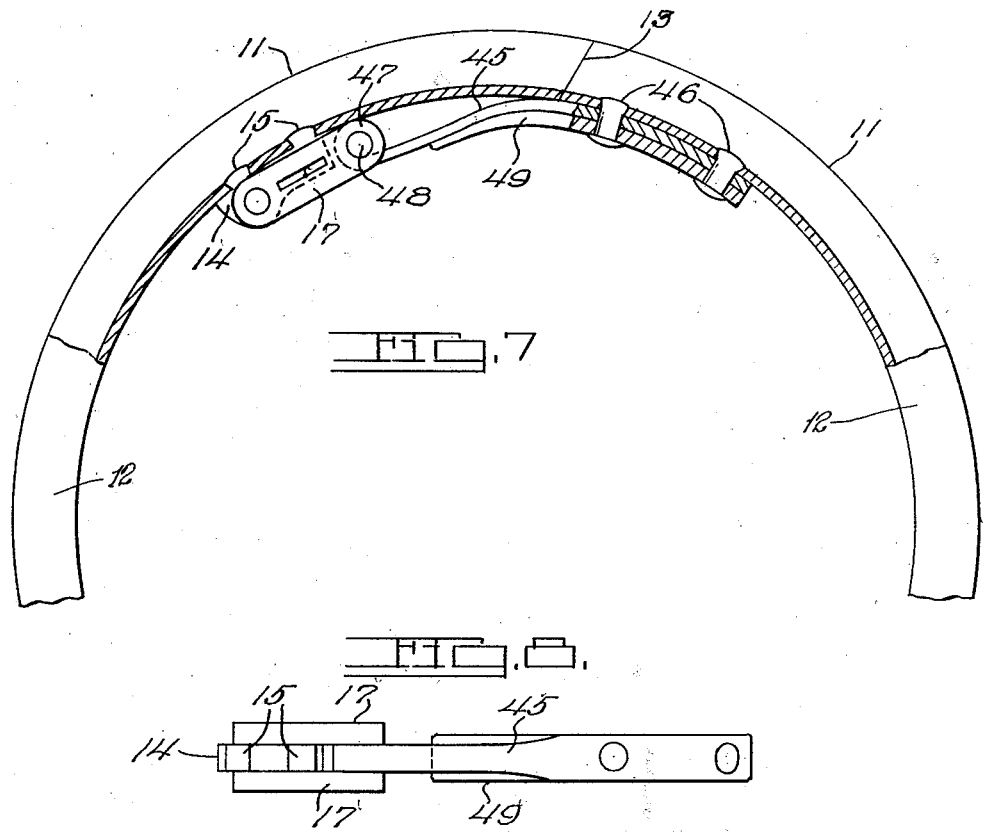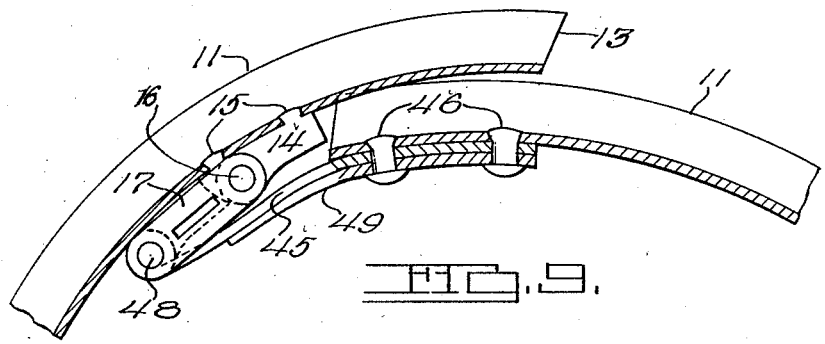

Patented May 31, 1932

1,861,238

UNITED STATES PATENT OFFICE

EMIL A. NELSON, OF DETROIT, MICHIGAN

TIRE RIM

Application filed July 17, 1929. Serial No. 378,836.

This invention relates to tire rims and particularly that class of rims employed on motor vehicles for receiving and retaining pneumatic tires, the principal object being the provision of a new and novel rim collapsing and expanding device for use in connection with such rims of the split type.

Another object is to provide a mechanism for collapsing a split tire rim including a linkage connection between the split ends of the rim and constructed to provide a lost motion.

Another object is to provide means for collapsing a split tire rim comprising linkage members connecting the split ends of the rim and including a yieldable member.

Another object is to provide a rim collapsing mechanism for split tire rims including linkages connecting the split ends of the rim and spring means co-operating therewith providing a lost motion movement for such linkages.

Another object is to provide a rim collapsing mechanism for split tire rims including a pair of links pivotally connected to each other joining the split ends of the rim, one of the links having a limited range of free rocking movement and being restrained against such movement by a resilient element.

Another object is to provide a collapsing device for a split tire rim comprising a link mechanism connecting the free ends of the rim and providing a toggle-type organization comprising a resilient member normally urging the links of said mechanism toward the positions they occupy when the rim is expanded.

A further object is to provide in combination with a split tire rim for a vehicle wheel, means for collapsing the rim including a movable link member having a notch, a second member having a notch therein in alignment with the first mentioned notch when the rim is in expanded position, the notches being adapted to receive a driving member on the wheel for the purpose of transmitting driving effort between the wheel and rim and for locking the rim in expanded position.

The above being among the objects of the present invention, same consists in certain novel features of construction and combinations of parts to be hereinafter described with reference to the accompanying drawings, and then claimed, having the above and other objects in view.

In the accompanying drawings, which illustrate the suitable embodiment of the present invention, and in which like numerals refer to like parts throughout the several different views, Fig. 1 is a partially broken side view of a rim for a vehicle wheel, the wheel felloe being shown in partially broken condition.

Fig. 2 is a plan view of the rim shown in Fig. 1, a portion of the same being broken away to better illustrate the rim collapsing mechanism.

Fig. 3 is a fragmentary broken view showing the rim in partially collapsed condition and illustrating the position of the collapsing mechanism at such time.

Fig. 4 is a view similar to Fig. 3 and illustrating the position of the collapsing mechanism when the rim is in fully collapsed condition.

Fig. 5 is a transverse sectional view taken as on line 5—5 of Fig. 1.

Fig. 6 is a perspective view of the tool employed for operating the collapsing mechanism.

Fig. 7 is a fragmentary side view of a rim showing a modified form of collapsing mechanism.

Fig. 8 is a view from below of the collapsing mechanism shown in Fig. 7.

Fig. 9 is a fragmentary broken view showing the position of the collapsing mechanism of Figs. 7 and 8 when the rim is in fully collapsed position.

There is now on the market and in general use a split rim having a contracting and expanding connection between the ends of the rim including a link. This link is pivotally connected to members rigidly secured to each of the ends of the rim, and in order to contract the rim the link is caused to rotate about one of its pivotal connections, thus causing the opposite end of the rim to move inwardly and under the first mentioned end. This type of expanding and contracting means is very successful when employed in connection with rims having a relatively light section, or at least a section in which the radial dimensions are not relatively great, such as in those rims employed on the lighter pleasure cars. However, when this type of collapsing means is employed in connection with tire rims of relatively heavy section and of relatively great radial depth, the radial movement which is imparted to one of the ends of the rim during the contracting operation is so great as to stress the metal of the rim beyond its elastic limit, and results in a permanent deformation of the rim out of its true normal circular form. Such a permanent deformation of the rim is of such a disadvantage that it is not considered wise to employ this type of expanding means in connection with rims of such a heavy section as will be permanently distorted thereby.

Because of the simplicity and ease of operation of this type of collapsing means it is desirable to use it whenever possible and the present invention provides a means of modifying such a construction whereby it may be used in connection with rims of heavy section without causing that distortion which would occur in the conventional form. It is to be understood, however, that it is not applicable only to rims of heavy sections, as it may be equally well used on rims of light section, but its chief advantage is that it may be used in connection with the rims of heavy section without causing permanent distortion thereof.

Referring to the accompanying drawings and particularly to Fig. 1, I show a conventional type of split rim comprising a base 10 which is provided with the usual integral side flanges 11 and 12. The rim shown in the drawings is split as at 13. An inwardly extending bracket member 14 is secured to the base 10 by stakes 15 at a point spaced from the line of split 13. Pivotally secured to the bracket 14 by a pin such as 16 are a pair of links 17, one disposed on each side of the bracket 14. A pair of additional brackets 18 are secured to the base 10 by means of stakes such as 19 adjacent to the line of split 13 and on the opposite side of the line of split from the bracket 14. The brackets 18 have portions which extend across the line of split 13 and are there provided with radially outwardly extending lugs 20 which are received in openings 21 formed in the base 10 on the opposite side of the line of split 13 from the stakes 19 when the rim is in normal expanded position. The inter-engagement of the lugs 20 and the openings 21 act to maintain the ends of the rim against separation and aid in maintaining them in proper alignment. Received between the brackets 18 and pivotally secured thereto by means of the pin 22 extending between them is a toggle-completing rocking link member 23 whose left hand end, as viewed in the figures, is pivotally connected by means of the pin 24 to the free ends of the links 17. The link 23 is provided with a portion 24' extending to the right, as indicated in the figures, beyond the pin 22. When the link 17 and link 23 have been moved so as to bring the pin 24 to its radially outermost position, by a "snap-action" in which it passes through the center line connecting pins 16 and 20, the rim is in normal expanded condition and is so held by the snap action exerted by the links, the end of the extension 24' being then in spaced relation with respect to the inner surface of the base 10. It will be apparent that when the links 17 and 23 have been moved from this position so as to move the pin 24 inwardly of the rim, the link 23 will rotate about the pin 22 until the end 24' abuts against the base 10, as shown in Fig. 3, at which time no further pivotal movement of the link 23 may occur in this direction, and if a continued clockwise rotation of the link 17 about the pin 16 occurs the left hand end of the rim, as viewed in the figures, will be forced downwardly and to the left, as shown in Fig. 4.

This arrangement provides, in effect, a snap action in the toggle organization provided by the linkages between the ends of the rim. Movement, such as might occur within the limits of this action, due to a tilting of the link 23 between the position shown in Fig. 3 to that shown in Fig. 1, is resisted by means of a resilient means such as a U-shaped spring member 25. The closed end of this member may normally rest in a notch 26 in the link 23; and its free ends are shown as outwardly bent and provided with locating or retaining projections 27, received in openings 28 in the base 10 of the rim on the right hand side of the line of split 13. Normally to urge the toggle links 17 and 23 toward their closed-rim positions, the intermediate portions of the spring 25 are sprung up over the projecting ends of the pin 22 which are circumferentially grooved as at 29 to receive the spring member. This inter-engagement of the spring member and the grooves 29 not only serves to maintain the pin 22 against end-wise movement but also serves to maintain the spring 25 under an initial tension.

In operation, a tool 30 such as is indicated in Fig. 6 and having end portions 31 of rectangular section is slipped over the rim and the ends 31 are inserted in openings 32 in the links 17, which openings are shaped to fit the ends 31. The tool 30 is then rotated so as to cause the links 17 to pivot in a clockwise direction, as viewed in the figures, about the axis of the pin 16. The resistance of the spring 25 to bending may at first be sufficient to cause the right hand end of the rim to move inwardly, but after a certain degree of such movement the resistance of the rim to bending will overcome the resistance of the spring 25 to bending and bend the spring 25 until the end of the extension 24′ on the link 23 will abut against the base 10, which will limit further pivotal movement of the link 23 and further bending of the spring 25. The position that the parts will assume at this phase of movement will be approximately that illustrated in Fig. 3. Thereafter upon further swinging of the links 17 about the pin 16 the operation of the parts will be as if the link 23 was rigidly connected to the right hand split end of the rim, and the right hand split end of the rim will be drawn to the left under the left hand split end of the rim until the links 17 come in contact with the base 10 on the opposite side of the pin 16 from their normal position, at which time the parts will assume the positions indicated in Fig. 4, and at which time the rim is in full collapsed condition, which will permit easy removal or application of a tire thereto. It will also be apparent that if the link 23 were rigidly connected to the right hand split end of the rim, as would approximate the conventional construction of this type of expanding mechanism, the right hand split end of the rim would have to move inwardly radially of the rim a much greater extent than is necessary in connection with the present construction, and the present invention in eliminating this excessive movement of the split end of the rim permits this type of mechanism to be employed without danger of permanent distortion of the rim.

The described provision of an extension 24′, to limit rocking movement of the link 23, thus serves to prevent excessive distortion of both the resilient element 25 and the split rim itself,—by obviating any relative radial displacement of the ends substantially in excess of that requisite to the overlapping shown in Fig. 4, during contraction of said rim. Although all the figures may be regarded as somewhat diagrammatic, the link 17 will be understood to be proportioned with regard both to this radial displacement and to the desired degree of peripheral contraction. Maximum expansion of the rim occurs as the pin 18 snaps through the line connecting the pins 16 and 22.

Furthermore, the force necessary to collapse a rim, in view of the materially less maximum distortion of the rim necessary in placing it in fully collapsed position, is materially less than in the conventional construction above described. In fact, as compared to the conventional construction and rims of the same size, less than half of the force is necessary to collapse the rim with the present construction. This is an important feature, particularly in view of the fact that with the conventional construction on heavy rims it is sometimes impossible for a man to collapse the rim without aid because of the force required.

In demountable rims of the type described it is conventional practice to provide a positive driving means between the rim and the wheel felloe. A usual means of providing this positive driving means is to provide a radially inwardly extending lug on the rim and provide the lug with a notch which is adapted to fit over one of the rim clamping bolts carried by the wheel felloe. This same type of means is preferably provided in connection with the present invention and in addition it is employed in such a manner that the driving effort between it and the felloe is transmitted to both of the split ends of the rim, and is further employed to lock the contracting mechanism against operation while the rim is on the wheel.

In carrying out this phase of the present invention the bracket members 18 are provided with aligned notches 35. The link 23 is provided with a corresponding notch 36 which is in alignment with the notches 35 when the rim is in expanded condition as illustrated in Fig. 1. The wheel felloe 37 is provided with a plurality of axially parallel bolts 38 which project out past one side of the felloe 37 and receive thereon the clamping members 39, the outer ends of which are adapted to press against the wedge members 40 upon tightening of the nuts 41 in order to lock the rim to the wheel. When the rim is applied to the wheel in full expanded condition it is so positioned that the notches 35 and 36 receive therein one of the bolts 38. The driving effort between the rim and the wheel is therefore positively transmitted through the bolt 38 and brackets 18 to one side of the line of split, and through the lug 20 and links 17 and bracket 14 to the opposite side of the line of split. Furthermore, in view of the fact that the link 23 is pivotable relative to the brackets 18, the grooves or notches 35 and 36 are in alignment only when the link 23 has been rotated to its extreme clockwise position, in which the rim is in full expanded position. Thus the bolt 38 in engaging the grooves or notches 35 and 36 maintains such notches in alignment when the rim is on the wheel and therefore prevents any collapsing tendency on the part of the rim.

The construction illustrated in Figs. 1 to 6 inclusive may of course be modified in various manners to effect the same result without departing from the present invention. One method of modifying the construction is shown in Figs. 7 to 9 inclusive. In this case the bracket 14 and links 17 are provided as before described and in substantially the same relative location as respects the line of split 13. In this case, however, instead of providing the link 23 and toggle-completing 25, a leaf-like spring member 45 is employed. If resilient, this member 45 may be rigidly connected to the right hand end of the rim as by rivets 46 and its free end may be provided with an eye 47 which is connected to the links 17 by means of a pin 48. A supplementary spring member 49 reinforcing the member and urging it toward an outer position is preferably employed as shown. The operation of this device is essentially the same as that described previously, with the exception that there is no positive means for limiting the bending movement of the spring 45, and the inward movement of the right hand end of the rim is entirely dependent upon the resistance of the spring 45 to excessive bending. The relative locations of the parts in this construction in expanded and collapsed condition is illustrated in Figs. 7 and 9. This last construction may meet more favor in connection with rims of relatively light section, but the first described construction is preferably employed with relatively stiff rims.

Formal changes may be made in the specific embodiment of the invention described without departing from the spirit and substance of the broad invention, the scope of which is commensurate with the appended claims; and it will be understood that the members 23 and 45 are referred to as toggle-completing members for the reason that movement thereof from a position of alignment with link 17 tends to contract the rim, by drawing pivots 22 and 16, or the like, together.

What I claim is:

1. In combination, a split tire rim, and means for contracting said rim comprising a link pivotally connected at one end to one of the ends formed by the splitting of said rim, a bracket rigidly connected to the other of the ends of said rim, said bracket having a portion overlying the line of split of said rim and having a lug receivable in an opening in the first mentioned end when said rim is in expanded position, an arm pivotally mounted between its ends on said bracket and limited in its swinging movement by contact of its ends with said rim, one end of said arm being pivotally connected to the free end of said link, and spring means co-operating between said arm and said rim constantly urging said arm towards one limit of its pivotal position.

2. In combination, a split tire rim, and means for contracting said rim comprising a link pivotally connected at one end to said rim on one side of the line of split thereof, a bracket rigidly connected to said rim on the other side of the line of split thereof, an arm pivotally connected to the last mentioned bracket by means of a pin, one end of said arm being pivotally connected to the free end of said link, and a spring constantly urging said arm towards one limit of its pivotal position, said spring being held in constantly flexed condition by engagement with said pin.

3. In combination, a split tire rim, and means for contracting said rim comprising a link pivotally connected at one end to said rim on one side of the line of split thereof, a bracket rigidly connected to said rim on the other side of the line of split thereof, an arm pivotally connected to the last mentioned bracket by means of a pin, said pin being provided with a groove therein, one end of said arm being pivotally connected to the free end of said link, and a spring constantly urging said arm towards one limit of its pivotal position, said spring engaging said rim at one end and said arm at the other end and being flexed over said pin and seating in said groove therein whereby it is placed under an initial tension and locks said pin against axial displacement.

4. In combination, a contractible and expansible split tire rim, and means for contracting said rim comprising a link pivoted at one end to said rim on one side of the line of split thereof, a member pivotally connected to said rim on the other side of the line of split thereof and to said link, and means for permitting only a limited rocking movement of said member relative to said other side.

5. In combination, a contractible and expansible split tire rim, and means for contracting said rim comprising a link pivoted at one end to said rim on one side of the line of split thereof, a member pivotally connected between its ends to said rim on the other side of the line of split thereof and to said link, and means near the respective ends of said member, for limiting a rocking movement of said member, relative to said other side, one of said ends comprising an extension on said member adapted to engage said rim when said rim is not closed.

6. In combination, a contractible and expansible split tire rim, and means for contracting said rim comprising a link pivotally secured at one end to said rim on one side of the line of split thereof and a resilient connection between the free end of said link and said rim on the other side of said line of split.

7. In combination, a contractable and expansible split tire rim, and means for contracting said rim comprising a link pivoted at one end to said rim on one side of the line of split thereof, and a member pivotally connected between its ends near an end of said rim on the other side of said line of split and adapted for a limited rocking movement thereon between two predetermined limits, one end of said member being pivotally connected to said link, and the other end thereof being engageable with said rim adjacent said end.

8. In combination, with a split tire rim, a link pivotally connected at one end to said rim on one side of the line of split thereof, and a spring secured to said rim on the other side of the line of split thereof and pivotally connected to the free end of said link.

9. In combination with a contractable and expansible split tire rim, a link pivoted at one end to said rim on one side of the line of split thereof, a member pivotally secured to said rim on the other side of said line of split and pivotally connected at one end to the free end of said link, said member having a part projecting away from the pivot thereof in a direction opposite to its mentioned end, said part being spaced from said rim when said rim is in expanded position but adapted to contact with said rim upon a rotative movement of said link sufficient to enable the ends of said rim to overlap, in further collapse thereof.

10. In combination with a contractable and expansible split tire rim, a link pivoted at one end to said rim on one side of the line of split thereof, a member pivotally secured to said rim on the other side of said line of split and pivotally connected at one end to the free end of said link, and means so limiting pivotal movement of said member relative to said rim as to obviate radial displacement of the ends of said rim substantially in excess of that requisite to an overlapping relationship thereof in the contraction of said rim.

11. In combination with a contractable and expansible split tire rim, a link pivotally secured at one end to said rim on one side of the line of split thereof, a bracket secured to said rim on the other side of the line of split thereof, a member pivotally connected to both said link and said bracket, and resilient means biasing said member toward a closed-rim position, said member and said bracket being provided with grooves therein spaced from their line of pivotal connection but in the same radial plane therewith and aligning with each other when said rim is in expanded position.

12. In combination, a rim provided with a single transverse split; and a manually manipulable toggle-type linkage organization for expanding and contracting the same,—said organization including resilient means normally urging a link thereof toward a closed-rim position.

13. In combination, a rim provided with a single transverse split; and a manually manipulable toggle-type linkage organization for expanding and contracting the same,—said organization including resilient means normally urging a link thereof toward a closed-rim position, and means safeguarding said resilient means.

14. In combination, a rim provided with a single transverse split; and a manually manipulable toggle-type linkage organization for expanding and contracting the same,—said organization including resilient means normally urging a link thereof toward a closed-rim position, and means for so limiting the rotative movement of one link of said organization as to safeguard said resilient means.

15. In combination, a rim provided with a single transverse split; and a manually manipulable toggle-type linkage organization for expanding and contracting the same,—said organization including resilient means normally urging a link thereof toward a closed position, links comprised in said toggle-type organization being pivotally interconnected, and a rocking of one of said links being so restricted by an extension thereof, away from said split, as substantially to obviate relative radial displacement of said ends in excess of that requisite to an overlapping relationship thereof in the contraction of said rim.

16. In combination: a split rim; and snap-acting toggle-type linkage means for expanding and contracting said rim.

17. In combination, a contractable and expansible split tire rim, and means for contracting said rim comprising a link pivotally secured to said rim on one side of the line of split thereof and having a snap action connection with said rim on the other side of the line of split thereof, said snap action connection comprising a toggle-action organization which includes resilient means normally urging said link toward a closed-rim position.

18. In combination, a contractable and expansible split tire rim, and means for contracting said rim comprising a link pivotally connected at one end to the rim on one side of the line of split, a toggle-completing member connected to the rim on the other side of the line of split for limited swinging movement relative thereto, a pivotal connection between said link and means urging said link and said member toward closed-rim positions.

19. In combination with a contractable and expansible split tire rim, a resiliently yieldable toggle-type linkage connection between the opposite sides of the line of split thereof, a resilient element thereof tending to urge its links toward closed-rim positions.

20. In combination, a contractable and expansible split tire rim, and means for contracting said rim comprising a link pivoted at one end to said rim on one side of the line of split, a member pivotally connected to said rim on the other side of said line of split and to said link, means for limiting the pivotal movement of said member to a rocking thereof relative to said other of said ends, and spring means distinct from said rim, constantly urging said member towards one limit of its pivotal movement.

21. In combination with a contractable and expansible split tire rim, a link pivoted at one end to said rim on one side of the line of split thereof, a member pivotally secured to said rim on the other side of said line of split and pivotally connected at one end to the free end of said link, and means limiting further pivotal movement of said member relative to said rim after a collapsing movement of said rim sufficient to permit an overlapping of the ends thereof upon a further rotation of said link.

22. In combination with a contractable and expansible split tire rim, a link pivoted at one end to said rim on one side of the line of split thereof, a member pivotally secured to said rim on the other side of said line of split and pivotally connected at one end to the free end of said link, said member having a part projecting away from the pivot thereof in a direction opposite to its mentioned end, said part being spaced from said rim when said rim is in expanded position but adapted to contact with said rim upon a rotative movement of said link sufficient to enable the ends of said rim to overlap in another collapse thereof, and spring means constantly urging said part away from contact with said rim.

23. In combination with a contractable and expansible split tire rim, a link pivoted at one end to said rim on one side of the line of split thereof, a member secured to said rim on the other side of said line of split and pivotally connected at one end to the free end of said link, said connection between said member and said rim including a pivot pin permitting a pivotal movement of said member in one direction to said rim when said rim is in expanded position, and means cooperating between said member and said rim acting as a stop to prevent further pivotal movement in said direction after a collapsing movement of said link sufficient to enable the ends of said rim to overlap, in further collapse thereof.

EMIL A. NELSON.

CERTIFICATE OF CORRECTION.

Patent No. 1,861,238.

May 31, 1932.

EMIL A. NELSON.

It is hereby certified that error appears in the printed specification of the above numbered patent requiring correction as follows: Page 3, line 126, for "toggle-completing" read spring, and line 127, for "spring" read toggle-completing; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.